United States Patent
Gu et al.

(10) Patent No.: US 11,449,653 B2
(45) Date of Patent: Sep. 20, 2022

(54) CONVERTER PARAMETERIZED CONSTANT ADMITTANCE MODELING METHOD BASED ON CROSS INITIALIZATION

(71) Applicant: SOUTHEAST UNIVERSITY, Nanjing (CN)

(72) Inventors: Wei Gu, Nanjing (CN); Yang Cao, Nanjing (CN); Dehu Zou, Nanjing (CN); Ke Li, Nanjing (CN); Kun Shi, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 17/605,589

(22) PCT Filed: Apr. 6, 2021

(86) PCT No.: PCT/CN2021/085704
§ 371 (c)(1),
(2) Date: Oct. 22, 2021

(87) PCT Pub. No.: WO2021/258810
PCT Pub. Date: Dec. 30, 2021

(65) Prior Publication Data
US 2022/0269837 A1 Aug. 25, 2022

(30) Foreign Application Priority Data

Jun. 24, 2020 (CN) .......................... 202010590540.5

(51) Int. Cl.
*G06F 30/20* (2020.01)
*G06F 17/11* (2006.01)
(Continued)

(52) U.S. Cl.
CPC .............. *G06F 30/20* (2020.01); *G06F 17/11* (2013.01); *G06F 2111/10* (2020.01); *G06F 2113/04* (2020.01); *G06F 2119/06* (2020.01)

(58) Field of Classification Search
CPC ...... G06F 30/20; G06F 17/11; G06F 2113/04; G06F 2119/06; G06F 2111/10
See application file for complete search history.

(56) References Cited

U.S. PATENT DOCUMENTS

2007/0168173 A1* 7/2007 Wu .......................... G06F 30/30
703/14
2016/0314230 A1* 10/2016 Dufour ................. G06F 30/367

FOREIGN PATENT DOCUMENTS

| CN | 105045952 A | 11/2015 |
|---|---|---|
| CN | 108829982 A | 11/2018 |

(Continued)

*Primary Examiner* — Chuen-Meei Gan
(74) *Attorney, Agent, or Firm* — Bayramoglu Law Offices LLC (57) ABSTRACT

A converter parameterized constant admittance modeling method based on a cross initialization including the following steps: (1) performing parameterized modeling on a converter, wherein switches are modeled using a parametric historical current source constant admittance model and other components are modeled using a traditional electromagnetic transient simulation integral model in the converter; (2) detecting whether state switching occurs, performing cross initialization correction when occurring; (3) determining model parameters, and establishing an equivalent admittance matrix and an injection current source of a whole grid, to obtain an electromagnetic transient simulation equivalent model; (4) solving a network tide according to a basic solving equation I=YU to obtain an electromagnetic transient model simulation result of the converter at current time; and (5) calculating an equivalent admittance matrix and an injection current source at next time through a current (Continued)

network state quantity, and returning to step (2) until a simulation terminates.

5 Claims, 3 Drawing Sheets

(51) Int. Cl.
    *G06F 113/04*     (2020.01)
    *G06F 119/06*     (2020.01)
    *G06F 111/10*     (2020.01)

(56) References Cited

FOREIGN PATENT DOCUMENTS

| | | |
|---|---|---|
| CN | 108959671 A | 12/2018 |
| CN | 111881533 A | 11/2020 |

\* cited by examiner

FIG. 6

CONVERTER PARAMETERIZED CONSTANT ADMITTANCE MODELING METHOD BASED ON CROSS INITIALIZATION

CROSS REFERENCE TO THE RELATED APPLICATIONS

This application is the national stage entry of International Application No. PCT/CN2021/085704, filed on Apr. 6, 2021, which is based upon and claims priority to Chinese Patent Application No. 202010590540.5 filed on Jun. 24, 2020, the entire contents of which are incorporated herein by reference.

TECHNICAL FIELD

The present invention relates to the technical field of dynamic simulation and modeling of power systems, and in particular to, a converter parameterized constant admittance modeling method based on cross initialization.

BACKGROUND

Since the advent of the first thyristor in the 1950's, power electronic technology has begun to enter the stage of modern electrical drive technology. Silicon controlled rectifier devices developed on this basis were a revolution in the field of electrical drive. The transformation and control of electrical energy have entered the era of converters composed of power electronic devices from rotating converter units and static ion converters, which marked the birth of power electronics. In the 1970's, thyristors began to form a series of products ranging from low voltage and small current to high voltage and large current. Semi-controlled devices in which ordinary thyristors cannot be self-turned off were called the first generation of power electronic devices. With the continuous improvement on the theoretical research of power electronic technology and the manufacturing technology level, power electronic devices have been greatly developed in terms of ease and type, which was another leap in the power electronic technology. Self-turn-off fully controlled second-generation power electronic devices such as GTR, GTO, and P-MOSFET were successively developed. The third-generation power electronic devices represented by IGBTs have begun to develop toward great ease, high frequency, fast response, and low loss. In the 1990's, power electronic devices were developing toward complication, standard modularization, intelligence, and power integration. Based on this, theoretical research, device development, and application penetration of power electronic technology have been launched. The power electronic technology is the most competitive high-tech field internationally.

With the further application of large-capacity flexible DC (direct current) transmission and flexible AC (alternating current) transmission in China's power grid, as well as the large-scale access of microgrids in the power grid and renewable energy, modern power systems are showing the trend of power electronics and the characteristics of increasing complexity. The simulation analysis and research on the operating state of renewable energy are increasingly important. Traditional digital electromechanical transient simulation has been unable to achieve accurate simulation, and digital electromagnetic transient simulation has gradually become an effective means of accurately simulating the current and future power grids. However, the frequent switching frequencies and complex control strategies of a large number of power electronic devices make the traditional digital electromagnetic transient simulation efficiency extremely low, which is highly inconsistent with the requirements for simulation efficiency in research, production, simulation, etc. of today's power systems. Therefore, it is necessary to study a high-efficiency digital electromagnetic transient simulation technology under the premise of accuracy.

The high-frequency characteristics of power electronic devices have brought great difficulties to hardware-in-the-loop simulation. Particularly converters, which are widely used in new energy, have always been the key point of simulation analysis of power systems. The processing of power electronic switches is related to the accuracy and efficiency of the whole grid solution. In a system with a large number of power electronic devices, such as HVDC thigh voltage direct current) and FACTS (flexible alternating current transmission system), how to simulate power electronic switches therein is the main difficulty in the simulation of this type of system. In order to balance the simulation precision and time, an electromagnetic transient simulation model for power electronic switches may be optimized from an average model, characteristic analysis modeling, an integration method, an interpolation algorithm, etc. The optimization of the electromagnetic transient model for the switch devices can not only improve the simulation precision of the model, but also increase the maximum feasible step size of the simulation calculation to a certain extent and speed up the error convergence of state switching during the simulation, and is therefore significant for the development of high-precision electromagnetic transient simulation.

The electromagnetic transient simulation research in China has already possessed a certain scale, and electromagnetic transient simulation platforms such as ADPSS (advanced digital power system simulator), DDRTS (digital dynamic real-time simulator), Cloud PSS (cloud computing-based power system simulator), etc. have been gradually launched, which have reached a certain level in the field of electromagnetic transient simulation. However, the electromagnetic transient simulation research in China starts relatively late, and there is still a big gap with Japan, the United States, etc. The simulation of complex converter models in modern power systems is a key point in current electromagnetic transient simulation research. The simulation effects of converter models directly affect whether the new energy models in modern power systems can be controlled and operated stably.

The next 20 to 30 years will be a critical period for China's energy production and consumption patterns and adjustment and transformation of energy structures. New energy technologies will usher in broader development prospects and development opportunities. A parametric constant admittance model for a converter based on cross initialization can significantly improve the precision of electromagnetic transient simulation of new energy and the maximum feasible step size of the simulation, well solve the problem of virtual power loss and guide the electromagnetic transient simulation modeling of power electronic devices, and is of great significance in the electromagnetic transient analysis of modern power systems.

SUMMARY

The technical problem to be solved by the present invention is to provide a converter parameterized constant admittance modeling method based on cross initialization. In the electromagnetic transient simulation of a power electronic converter model, especially the small step simulation, the converter model is optimized to improve the simulation precision of the model and the maximum feasible simulation step size, well solve the problem of virtual power loss, and further improve the simulation speed and precision of small-step electromagnetic transient simulation of the power electronic converter.

In order to solve the above technical problems, the present invention discloses a converter parameterized constant admittance modeling method based on cross initialization, comprising the following steps:

(1) performing electromagnetic transient simulation modeling on a power electronic converter in which switches are modeled using a parametric historical current source constant admittance model and other components are modeled using a traditional electromagnetic transient simulation integral model, and giving an initial value and a step size of the system;

(2) detecting whether operating state switching occurs, performing cross initialization correction if state switching occurs, or skipping processing if state switching does not occur;

(3) calculating model parameters according to the network topology and expected control effect, and establishing an equivalent electromagnetic admittance matrix and a historical current source of a whole grid, to obtain an electromagnetic transient simulation equivalent model of the converter;

(4) solving, according to an electromagnetic transient basic solving equation I=YU, an equation established by the electromagnetic transient simulation equivalent model to obtain an electromagnetic transient model simulation result of the converter at current time, where I is current, Y is admittance, and U is voltage; and (5) updating the electromagnetic transient simulation equivalent admittance matrix and the historical current source based on the current state quantity of each node in the network for solving at next time, and returning to step (2)_until a simulation termination time arrives.

Preferably, in step (1), the electromagnetic transient simulation model of the converter comprises power electronic switches, inductors, capacitors and a control portion, and the specific relationship of which is as follows:

DC side voltage $U_{dc}$ is provided by an external DC voltage source, and DC side output current $I_{dc}$, and output power $P_{dc}$ passthrough DC side parallel capacitors and then are introduced into several groups of bridge arms composed of upper and lower switches and transmitted to an AC power grid $U_{ac}$; the power grid feeds active power $P_{grid}$ and reactive power $Q_{grid}$ back to an outer loop controller, the outer loop controller outputs current reference values idref and iqref to an inner loop controller, and the inner loop controller compares AC side dq axis current components id and iq with the reference values to generate a Sinusoidal Pulse Width Modulation SPWM control signal of the converter.

Preferably, in step (2), the cross initialization correction method is specifically:

at the time when the operating state of the converter is switched, an injection current source for a motion switch is calculated using the historical state quantities of the voltage and current of another switch on the corresponding bridge arm, which can greatly reduce the error offset of the initial value at the switching time; the operating state of the converter is assumed to switch from $S_1$ off and $S_2$ on to $S_1$ on and $S_2$ off, and the initial values of cross initialization are obtained:

$$\begin{cases} u'_{up}(t-\Delta t) = u_{down}(t-\Delta t) \\ u'_{down}(t-\Delta t) = u_{up}(t-\Delta t) \\ i'_{up}(t-\Delta t) = -i_{down}(t-\Delta t) \\ i'_{down}(t-\Delta t) = -i_{up}(t-\Delta t) \end{cases}$$

The injection current sources $I_{inj,up}(t), I_{inj,down}(t)$ at the time of state switching are solved using the initial values of the state quantities, where $u_{up}'(t-\Delta t)$ is a new initial value of a voltage of an upper bridge arm of the converter at the previous time $(t-\Delta t)$; $u_{down}(t-\Delta t)$ is a voltage of a lower bridge arm of the converter at the previous time $(t-\Delta t)$; $u'_{down}(t-\Delta t)$ is a new initial value of a voltage of the lower bridge arm of the converter at the previous time $(t-\Delta t)$, $u_{up}(t-\Delta t)$ is a voltage of the upper bridge arm of the converter at the previous time $(t-\Delta t)$; $i'_{up}(t-\Delta t)$ is a new initial value of a current of the upper bridge arm of the converter at the previous time $(t-\Delta t)$; $i_{down}(t-\Delta t)$ is a current of the lower bridge arm of the converter at the previous time $(t-\Delta t)$; $i'_{down}(t-\Delta t)$ is a new initial value of a current of the lower bridge arm of the converter at the previous time $(t-\Delta t)$, and $i_{up}(t-\Delta t)$ is a current of the upper bridge arm of the converter at the previous time $(t-\Delta t)$.

Preferably, in step (3), establishing an electromagnetic transient simulation equivalent model of the converter is specifically:

a given power electronic switch is expressed by the following equation:

$$\begin{cases} i(t) = G_{eq}u(t) + I_{inj}(t) \\ I_{inj}(t) = \alpha G_{eq}u(t-\Delta t) + \beta i(t-\Delta t) \end{cases}$$

wherein, $\alpha$ and $\ominus$ are respectively a voltage coefficient and a current coefficient of an equivalent injection current source, i(t) is a current at time t, $G_{eq}$ is an electromagnetic transient simulation equivalent admittance, u(t) is a voltage at time t, $I_{inj}(t)$ is an equivalent injection current source at time t, $u(t-\Delta t)$ is a voltage at previous time $(t-\Delta t)$, and $i(t-\Delta t)$ is a current at previous time $(t-\Delta t)$. For components such as inductors as reflected as subscript L and capacitors as reflected as subscript C, an equivalent admittance and a historical current source are solved using a backward Euler method:

$$\begin{cases} i_L(t) = \frac{\Delta t}{L}u_L(t) + i_L(t-\Delta t) = G_{eq}u_L(t) + I_{inj,L}(t) \\ i_C(t) = \frac{C}{\Delta t}u_C(t) - \frac{C}{\Delta t}u_C(t-\Delta t) = G_{eq}u_C(t) + I_{inj,C}(t) \end{cases}$$

The above equations are algebraic equations including unknown state quantities voltage u(t) and current i(t) and known state quantities voltage $u(t-\Delta t)$ at the previous time and current $i(t-\Delta t)$ at the previous time. C is an equivalent capacitance when a switch is off and L is an equivalent inductance when a switch is on. The equations are simplified to obtain $i=G_{eq}*u+I_{inj}$, then an electromagnetic transient simulation equivalent admittance matrix $G_{eq}$ and an equivalent injection current source $I_{inj}$ can be obtained, and the algebraic equation set is solved according to I=YU.

Preferably, the step of establishing an electromagnetic transient simulation model according to the network topology and expected control effect is as follows:

(41) establishing a parametric constant admittance model of the converter:

$$\begin{cases} i_{up}(t) = G_{eq1}u_{up}(t) + I_{inj,up}(t) = G_{eq1}u_{up}(t) + \\ \quad \alpha_{up}G_{eq1}u_{up}(t-\Delta t) + \beta_{up}i_{up}(t-\Delta t) \\ i_{down}(t) = G_{eq2}u_{down}(t) + I_{inj,down}(t) = G_{eq2}u_{down}(t) + \\ \quad \alpha_{down}G_{eq2}u_{down}(t-\Delta t) + \beta_{down}i_{down}(t-\Delta t) \\ i_L(t) = G_L u_L(t) + I_{inj,L}(t) = G_L u_L(t) + i_L(t-\Delta t) \end{cases}$$

where $i_{up}(t)$ is a current of an upper bridge arm of the converter at time t, $i_{down}(t)$ is a current of a lower bridge arm of the converter at time t, $u_{up}(t)$ is a voltage of the upper bridge arm of converter at time t, $u_{down}(t)$ is a voltage of the lower bridge arm of the converter at time t, $i_{up}(t-\Delta t)$ is a current of the upper bridge arm of the converter at previous time $t-\Delta t$, $i_{down}(t-\Delta t)$ is a current of the lower bridge arm of the converter at previous time $t-\Delta t$, $u_{up}(t-\Delta t)$ is a voltage of the upper bridge arm of the converter at previous time $t-\Delta t$, $u_{down}(t-\Delta t)$ is a voltage of the lower bridge arm of the converter at previous time $t-\Delta t$, $I_{inj,up}(t)$ is an equivalent injection current source of the upper bridge arm of the converter at time t, $I_{inj,up}(t)$ is an equivalent injection current source of the lower bridge arm of the converter at time t, $\alpha_{up}$ and $\beta_{up}$ are respectively a voltage coefficient and a current coefficient of an equivalent injection current source of the upper bridge arm of the converter, $\alpha_{down}$ and $\beta_{down}$ are respectively a voltage coefficient and a current coefficient of an equivalent injection current source of the lower bridge arm of the converter, $G_{eq1}$ i is the electromagnetic transient simulation equivalent admittance of the upper bridge arm of the converter, $G_{eq2}$ is the electromagnetic transient simulation equivalent admittance of the lower bridge arm of the converter, $i_L(t)$ is a current of an inductance in the converter at time t, $i_L(t-\Delta t)$ is a current of an inductance in the converter at previous time $(t-\Delta t)$, $u_L(t)$ is a voltage of an inductance in the converter at time t, $G_L$ is an electromagnetic transient simulation equivalent admittance of the inductance, and $I_{inj,L}(t)$ is an equivalent injection current source of an inductance at time t;

(42) performing complex frequency domain steady-state operation analysis on the switch model to obtain a switch model parameter expression as:

$$\begin{cases} i_{on}(t) = G_{eq}u_{on}(t) + \alpha_{on}G_{eq}u_{on}(t-\Delta t) + i_{on}(t-\Delta t), & S = 1 \\ i_{off}(t) = G_{eq}u_{off}(t) - G_{eq}u_{off}(t-\Delta t) + \beta_{off}i_{off}(t-\Delta t), & S = 0 \end{cases},$$

where $i_{on}(t)$ is a current at time t when switch is on, $i_{off}(t)$ is a current at time t when switch is off, $i_{on}(t-\Delta t)$ is a current at previous time $(t-\Delta t)$ when switch is on, $i_{off}(t-\Delta t)$ is a current at previous time $(t-\Delta t)$ when switch is off, $u_{on}(t)$ is a voltage at time t when switch is on, $u_{off}(t)$ is a voltage at time t when switch is off, $u_{on}(t-\Delta t)$ is a voltage at previous time $(t-\Delta t)$ when switch is on, $u_{off}(t-\Delta t)$ is a voltage at previous time $(t-\Delta t)$ when switch is off; $\alpha_{on}$ is a voltage coefficient of an equivalent injection current source when switch is on, and $\beta_{off}$ is the current coefficient of the equivalent injection current source when switch is off;

(43) solving a matrix equation about a midpoint voltage of the converter bridge arms and the switches in the off state according to the network topology, taking a turn-on upper bridge arm switch and a turn-off lower bridge arm switch as an example:

$$\begin{bmatrix} u_{mid,n} \\ \dfrac{i_{down,n}}{G_{eq2}} \end{bmatrix} = \begin{bmatrix} k_{down} - \alpha_{up}k_{up} & (1-\beta_{down})k_{down} \\ k_{down} - 1 - \alpha_{up}k_{up} & (k_{down} - \beta_{down}k_{down} + \beta_{down}) \end{bmatrix}$$

-continued $$\begin{bmatrix} u_{mid,n-1} \\ \dfrac{i_{down,n-1}}{G_{eq2}} \end{bmatrix} + \begin{bmatrix} (1-k_{up}-k_{down})u_{pv} \\ (1-k_{up}-k_{down})u_{pv} \end{bmatrix} = A\begin{bmatrix} u_{mid,n-1} \\ \dfrac{i_{down,n-1}}{G_{eq2}} \end{bmatrix} + B,$$

where $\dfrac{G_{eq1}}{G_{eq1}+G_{eq2}+G_L}$, $k_{down} = \dfrac{G_{eq2}}{G_{eq1}+G_{eq2}+G_L}$, where $u_{mid,n}$ is a midpoint voltage of bridge arm of converter at time t, $u_{mid,n-1}$ is a midpoint voltage of bridge arm of the converter at previous time $(t-\Delta t)$, $I_{down}$ is a current of lower bridge arm of the converter at time $t$, $i_{down,n-1}$ is the current of lower bridge arm of converter at previous time $(t-\Delta t)$, $u_{pv}$, is the constant voltage on the dc side, $k_{up}$ and $k_{down}$ are respectively a coefficient of upper bridge arm and lower bridge arm of the converter, $G_{eq1}$ is the electromagnetic transient simulation equivalent admittance of upper bridge arm of converter, $G_{eq2}$ is the electromagnetic transient simulation equivalent admittance of lower bridge arm of converter, $G_L$ is an electromagnetic transient simulation equivalent admittance of the inductance;

(44) analyzing transient operating characteristics of the parameterized model to obtain corresponding parameters of the model in two different operating states as follows: when $$\begin{cases} S_{up} = 1 \\ S_{down} = 0 \end{cases};$$

$$\begin{cases} i_{up}(t) = G_{eq}u_{up}(t) + \dfrac{k_{down} + \sqrt{k_{down}}}{k_{up}}G_{eq}u_{up}(t-\Delta t) + i_{up}(t-\Delta t) \\ i_{down}(t) = G_{eq}u_{down}(t) - G_{eq}u_{down}(t-\Delta t) + \dfrac{\sqrt{k_{down}}}{\sqrt{k_{down}}+1}i_{down}(t-\Delta t) \end{cases};$$

when $$\begin{cases} S_{up} = 0 \\ S_{down} = 1 \end{cases};$$

$$\begin{cases} i_{up}(t) = G_{eq}u_{up}(t) - G_{eq}u_{up}(t-\Delta t) + \dfrac{\sqrt{k_{up}}}{\sqrt{k_{up}}+1}i_{up}(t-\Delta t) \\ i_{down}(t) = G_{eq}u_{down}(t) + \dfrac{k_{up}+\sqrt{k_{up}}}{k_{down}}G_{eq}u_{down}(t-\Delta t) + i_{down}(t-\Delta t) \end{cases},$$

where $i_{up}(t)$ is a current of upper bridge arm of the converter at time t, $i_{down}(t)$ is a current of lower bridge arm of the converter at time t, $i_{up}(t-\Delta t)$ is a current of upper bridge arm of the converter at previous time $(t-\Delta t)$, $i_{down}(t-\Delta t)$ is a current of lower bridge arm of the converter at previous time $(t-\Delta t)$, $u_{up}(t)$ is a voltage of upper bridge arm of the converter at time t, $u_{down}(t)$ is a voltage of lower bridge arm of the converter at time t, $u_{up}(t-\Delta t)$ is a voltage of upper bridge arm of the converter at previous time $(t-\Delta t)$, $u_{down}(t-\Delta t)$ is a voltage of lower bridge arm of the converter at previous time $(t-\Delta t)$, and $G_{eq}$ is an electromagnetic transient simulation equivalent admittance;

(45) establishing models for the control link, grid-side interface, etc. of the electromagnetic transient simulation system of the converter, combining the basic equation I=YU of the electromagnetic transient simulation system of the whole grid; and (46) solving the electromagnetic transient simulation equation of the converter in combination with interface parameters, to obtain the current state quantity of each node for updating the electromagnetic transient equivalent admittance matrix and historical current source, and returning to step (43) to continue the calculation until the simulation termination time arrives.

The beneficial effects of the present invention are: an electromagnetic transient simulation model for a power electronic converter is established by a parameter method, which has the advantage of establishing a pure mathematical model without being restricted by an actual physical object, to further ensure that the converter model has desired operating characteristics; the cross initialization method for the switching and correction of the model state greatly reduces transient errors caused by state switching, thereby greatly reducing ripples of voltage, current, and power and well solving the problem of virtual power loss; compared with a traditional constant admittance simulation model, the precision of the improved converter model is greatly increased, which will greatly improve the simulation result of electromagnetic transient simulation of the power electronic converter, solve the problem of virtual power loss to a great extent during state switching, and guide the electromagnetic transient modeling of new energy in the future, and is of great significance to the further development of electromagnetic transient simulation modeling.

DETAILED DESCRIPTION OF THE EMBODIMENTS

The technical solution of the invention will be described in detail below in conjunction with the accompanying drawings. The present invention establishes an electromagnetic transient model of a converter by using a parameterization method, analyzes operating characteristics of the model to determine optimal parameters, processes state switching errors by using a cross initialization method, and builds a constant admittance electromagnetic transient simulation parameterization model of the converter, thereby proposing a novel converter parameterized constant admittance modeling method based on cross initialization.

Figure 1:
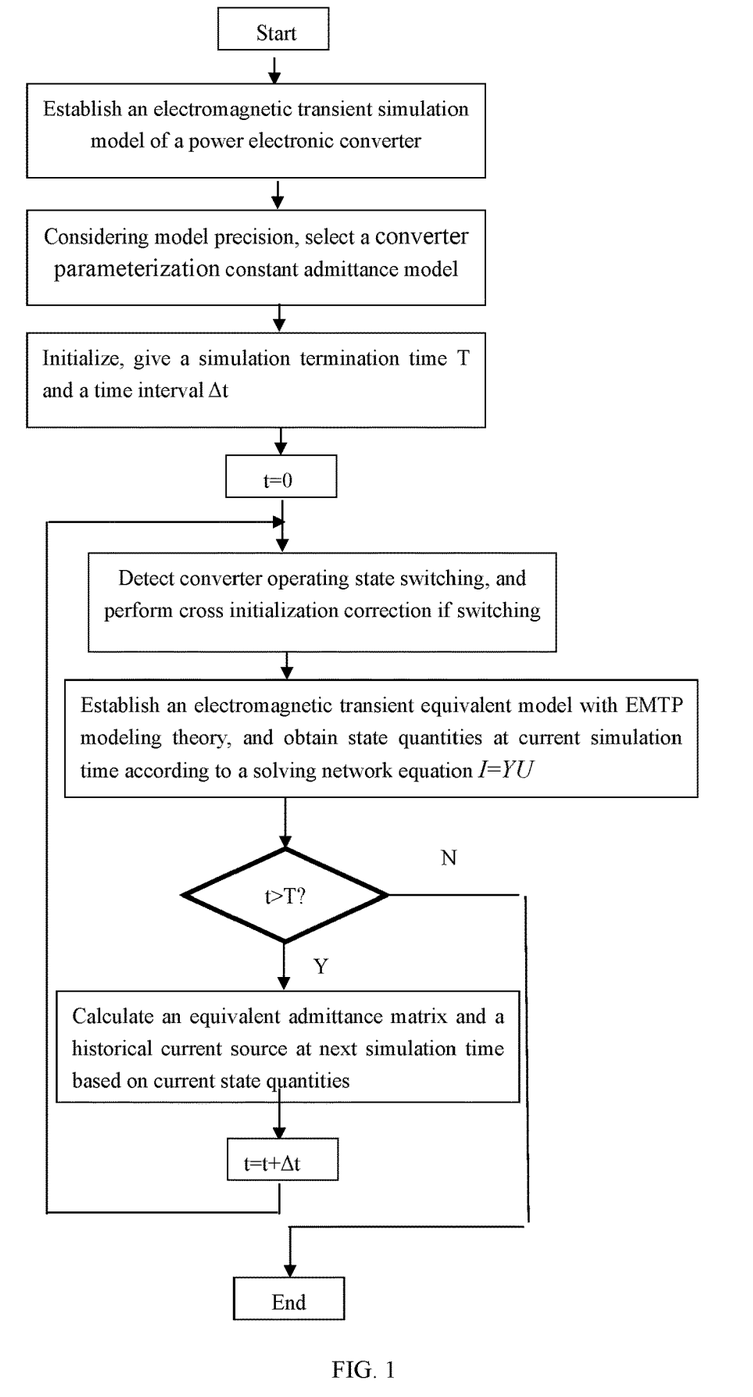
FIG. 1 is a schematic flow diagram of a method according to the present invention.
Figure 2:
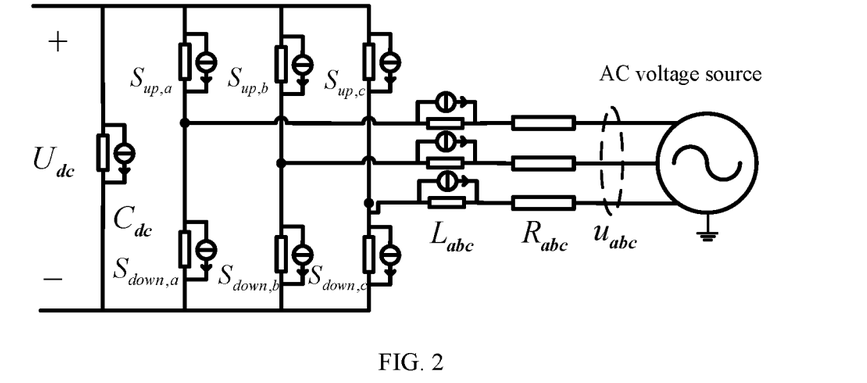
FIG. 2 is a schematic diagram of a converter electromagnetic transient simulation model according to the present invention.

A converter parameterized constant admittance modeling method based on cross initialization disclosed in the present invention is shown in FIG. 1, including the following steps:

Step (1) electromagnetic transient simulation modeling is performed on a power electronic converter in which switches are modeled using a parametric historical current source constant admittance model and other components are modeled using a traditional electromagnetic transient simulation integral model, and an initial value and a step size of the system are given;

Step (2) whether operating state switching occurs is detected, cross initialization correction is performed if state switching occurs, or any processing is not performed if state switching does not occur;

Step (3) model parameters are calculated according to the network topology and expected control effect, and an equivalent electromagnetic admittance matrix and a historical current source of a whole grid are established, to obtain an electromagnetic transient simulation equivalent model of the converter;

Step (4) an equation established by the electromagnetic transient simulation equivalent model is solved according to an electromagnetic transient basic solving equation I=YU, to obtain an electromagnetic transient model simulation result of the converter at current time, wherein I is current, Y is admittance, and U is voltage;

Step (5) the electromagnetic transient simulation equivalent admittance matrix and the historical current source are updated based on the current state quantity of each node in the network for solving at next time, and step (2) is returned until a simulation termination time arrives. Step (11), the relationship between internal links of the electromagnetic transient simulation model of the converter is as follows:

DC side voltage $U_{dc}$ is provided by an external DC voltage source, and DC side output current $I_{dc}$ and output power $P_{dc}$ pass through DC side parallel capacitors and then are introduced into several groups of bridge arms composed of upper and lower switches and transmitted to an AC power grid $U_{ac}$; the power grid feeds active power $P_{grid}$ and reactive power $Q_{grid}$ back to an outer loop controller, the outer loop controller outputs current reference values idref and iqref to an inner loop controller, and the inner loop controller compares AC side dq axis current components id and iq with the reference values to generate an SPWM control signal of the converter.

Figure 3:
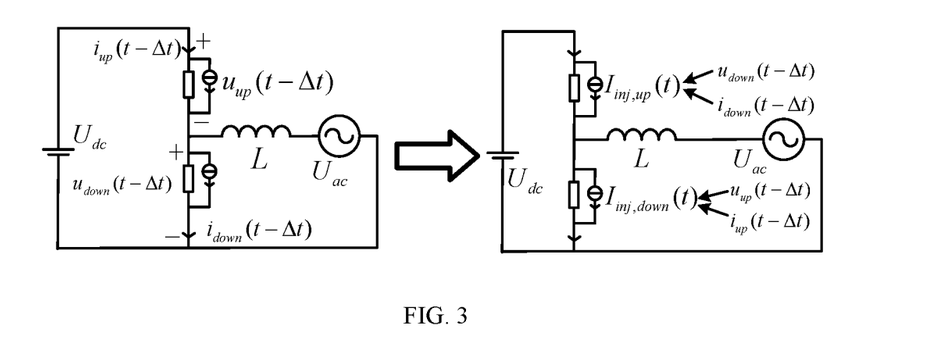
FIG. 3 is a schematic diagram of the cross initialization principle according to the present invention.

Step (21), the cross initialization correction method is specifically as follows:

At the time when the operating state of the converter is switched, an injection current source for a_motion switch is calculated using the historical state quantities of the voltage and current of another switch on the corresponding bridge arm, which can greatly reduce the error offset of the initial value at the switching time; the operating state of the converter is assumed to switch from $S_1$ off and $S_2$ on to $S_1$ on and $S_2$ off, and the initial values of cross initialization are obtained:

$$\begin{cases} u'_{up}(t-\Delta t) = u_{down}(t-\Delta t) \\ u'_{down}(t-\Delta t) = u_{up}(t-\Delta t) \\ i'_{up}(t-\Delta t) = -i_{down}(t-\Delta t) \\ i'_{down}(t-\Delta t) = -i_{up}(t-\Delta t) \end{cases}$$

The injection current sources $I_{inj,up}(t), I_{inj,down}(t)$ at the time of state switching are solved using the initial values of the state quantities, where $u_{up}'(t-\Delta t)$ is a new initial value of a voltage of an upper bridge arm of the converter at the previous time $(t-\Delta t)$; $u_{down}(t-\Delta t)$ is a voltage of a lower bridge arm of the converter at the previous time $(t-\Delta t)$; $u_{down}'(t-\Delta t)$ is a new initial value of a voltage of the lower bridge arm of the converter at the previous time $(t-\Delta t)$, $u_{up}(t-\Delta t)$ is a voltage of the upper bridge arm of the converter at the previous time $(t-\Delta t)$; $i_{up}'(t-\Delta t)$ is a new initial value of a current of the upper bridge arm of the converter at the previous time (t−Δt); $i_{down}$(t−Δt) is a current of the lower bridge arm of the converter at the previous time (t−Δt); $i_{down}'$(t−Δt) is a new initial value of a current of the lower bridge arm of the converter at the previous time (t−Δt), and $i_{up}$(t−Δt) is a current of the upper bridge arm of the converter at the previous time (t−Δt).

Step (31), establishing an electromagnetic transient simulation equivalent model of the converter is specifically as follows:

A given power electronic switch is expressed by the following equation:

$$\begin{cases} i(t) = G_{eq}u(t) + I_{inj}(t) \\ I_{inj}(t) = \alpha G_{eq}u(t - \Delta t) + \beta i(t - \Delta t) \end{cases}$$

where, α and β are respectively a voltage coefficient and a current coefficient of an equivalent injection current source, i(t) is a current at time t, $G_{eq}$ is an electromagnetic transient simulation equivalent admittance, u(t) is a voltage at time t, $I_{inj}$(t) is an equivalent injection current source at time t, u(t−Δt) is a voltage at previous time (t−Δt), and i(t−Δt) is a current at previous time t−Δt).

For components such as inductors and capacitors, an equivalent admittance and a historical current source are solved using a backward Euler method:

$$\begin{cases} i_L(t) = \frac{\Delta t}{L}u_L(t) + i_L(t - \Delta t) = G_{eq}u_L(t) + I_{inj,L}(t) \\ i_C(t) = \frac{C}{\Delta t}u_C(t) - \frac{C}{\Delta t}u_C(t - \Delta t) = G_{eq}u_C(t) + I_{inj,C}(t) \end{cases}$$

The above equations are algebraic equations including unknown state quantities voltage u(t) and current i(t) and known state quantities voltage u(t−Δt) at the previous time and current i(t−Δt) at the previous time. C is an equivalent capacitance when a switch is off and L is an equivalent inductance when a switch is on. The equations are simplified to obtain $i=G_{eq}*u+I_{inj}$, then an electromagnetic transient simulation equivalent admittance matrix $G_{eq}$ and an equivalent injection current source $I_{inj}$ can be obtained, and the algebraic equation set is solved according to I=YU. The specific process of establishing an electromagnetic transient simulation model according to the network topology and expected control effect is:

Step (41), a parametric constant admittance model of the converter is established:

$$\begin{cases} i_{up}(t) = G_{eq1}u_{up}(t) + I_{inj,up}(t) = G_{eq1}u_{up}(t) + \\ \qquad \alpha_{up}G_{eq1}u_{up}(t - \Delta t) + \beta_{up}i_{up}(t - \Delta t) \\ i_{down}(t) = G_{eq2}u_{down}(t) + I_{inj,down}(t) = G_{eq2}u_{down}(t) + , \\ \qquad \alpha_{down}G_{eq2}u_{down}(t - \Delta t) + \beta_{down}i_{down}(t - \Delta t) \\ i_L(t) = G_L u_L(t) + I_{inj,L}(t) = G_L u_L(t) + i_L(t - \Delta t) \end{cases}$$

where $i_{up}$(t) is a current of an upper bridge arm of the converter at time t, $i_{down}$(t) is a current of a lower bridge arm of the converter at time t, $u_{up}$(t) is a voltage of the upper bridge arm of converter at time t, $u_{down}$(t) is a voltage of the lower bridge arm of the converter at time t, $i_{up}$(t−Δt) is a current of the upper bridge arm of the converter at previous time t−Δt, $i_{down}$(t−Δt) is a current of the lower bridge arm of the converter at previous time t−Δt, $u_{up}$(t−Δt) is a voltage of the upper bridge arm of the converter at previous time t−Δt, $u_{down}$(t−Δt) is a voltage of the lower bridge arm of the converter at previous time t−Δt, $I_{inj,up}$(t) is an equivalent injection current source of the upper bridge arm of the converter at time t, $I_{inj,down}$(t) is an equivalent injection current source of the lower bridge arm of the converter at time t, $\alpha_{up}$ and $\beta_{up}$ are respectively a voltage coefficient and a current coefficient of an equivalent injection current source of the upper bridge arm of the converter, $\alpha_{down}$ and $\beta_{down}$ are respectively a voltage coefficient and a current coefficient of an equivalent injection current source of the lower bridge arm of the converter, $G_{eq1}$ is the electromagnetic transient simulation equivalent admittance of the upper bridge arm of the converter, $G_{eq2}$ is the electromagnetic transient simulation equivalent admittance of the lower bridge arm of the converter, $i_L$(t) is a current of an inductance in the converter at time t, $i_L$(t−Δt) is a current of an inductance in the converter at previous time (t−Δt), $u_L$(t) is a voltage of an inductance in the converter at time t, $G_L$ is an electromagnetic transient simulation equivalent admittance of the inductance, and $I_{inj,L}$(t) is an equivalent injection current source of an inductance at time t;

Step (42), complex frequency domain steady-state operation analysis is performed on the switch model, to obtain a switch model parameter expression as:

$$\begin{cases} i_{on}(t) = G_{eq}u_{on}(t) + \alpha_{on}G_{eq}u_{on}(t - \Delta t) + i_{on}(t - \Delta t), & S = 1 \\ i_{off}(t) = G_{eq}u_{off}(t) - G_{eq}u_{off}(t - \Delta t) + \beta_{off}i_{off}(t - \Delta t), & S = 0 \end{cases}$$

where $i_{on}$(t) is a current at time t when switch is on, $i_{off}$(t) is a current at time t when switch is off, $i_{on}$(t−Δt) is a current at previous time (t−Δt) when switch is on, $i_{off}$(t−Δt) is a current at previous time (t−Δt) when switch is off, $u_{on}$(t) is a voltage at time t when switch is on, $u_{off}$(t) is a voltage at time t when switch is off, $u_{on}$(t−Δt) is a voltage at previous time (t−Δt) when switch is on, $u_{off}$(t−Δt) is a voltage at previous time (t−Δt) when switch is off; $\alpha_{on}$ is a voltage coefficient of an equivalent injection current source when switch is on, and $\beta_{off}$ is the current coefficient of the equivalent injection current source when switch is off;

Step (43), a matrix equation about a midpoint voltage of the converter bridge arms and the switches in the off state is solved according to the network topology, taking a turn-on upper bridge arm switch and a turn-off lower bridge arm switch as an example:

$$\begin{bmatrix} u_{mid,n} \\ \frac{i_{down,n}}{G_{eq2}} \end{bmatrix} = \begin{bmatrix} k_{down} - \alpha_{up}k_{up} & (1 - \beta_{down})k_{down} \\ k_{down} - 1 - \alpha_{up}k_{up} & (k_{down} - \beta_{down}k_{down} + \beta_{down}) \end{bmatrix}$$

$$\begin{bmatrix} u_{mid,n-1} \\ \frac{i_{down,n-1}}{G_{eq2}} \end{bmatrix} + \begin{bmatrix} (1 - k_{up} - k_{down})u_{pv} \\ (1 - k_{up} - k_{down})u_{pv} \end{bmatrix} = A \begin{bmatrix} u_{mid,n-1} \\ \frac{i_{down,n-1}}{G_{eq2}} \end{bmatrix} + B,$$

where $$k_{down} = \frac{G_{eq1}}{G_{eq1} + G_{eq2} + G_L}$$
$$k_{down} = \frac{G_{eq2}}{G_{eq1} + G_{eq2} + G_L},$$

where $u_{mid,n}$ n is a midpoint voltage of bridge arm of converter at time t, $u_{mid,n-1}$ is a midpoint voltage of bridge arm of the converter at previous time (t−Δt), $i_{down}$ is a current of lower bridge arm of the converter at time $t_{idown,n-1}$ is the current of lower bridge arm of converter at previous time (t–Δt), $u_{pv}$ is the constant voltage on the dc side, $k_{up}$ and $k_{down}$ are respectively a coefficient of upper bridge arm and lower bridge arm of the converter, $G_{eq1}$ is the electromagnetic transient simulation equivalent admittance of upper bridge arm of converter, $G_{eq2}$ a is the electromagnetic transient simulation equivalent admittance of lower bridge arm of converter, $G_L$ is an electromagnetic transient simulation equivalent admittance of the inductance;

Step (44), transient operating characteristics of the parameterized model are analyzed, to obtain corresponding parameters of the model in two different operating states as follows:

when $$\begin{cases} S_{up} = 1 \\ S_{down} = 0 \end{cases};$$

$$\begin{cases} i_{up}(t) = G_{eq}u_{up}(t) + \dfrac{k_{down} + \sqrt{k_{down}}}{k_{up}} G_{eq}u_{up}(t - \Delta t) + i_{up}(t - \Delta t) \\ i_{down}(t) = G_{eq}u_{down}(t) - G_{eq}u_{down}(t - \Delta t) + \dfrac{\sqrt{k_{down}}}{\sqrt{k_{down}} + 1} i_{down}(t - \Delta t) \end{cases};$$

when $$\begin{cases} S_{up} = 0 \\ S_{down} = 1 \end{cases};$$

$$\begin{cases} i_{up}(t) = G_{eq}u_{up}(t) - G_{eq}u_{up}(t - \Delta t) + \dfrac{\sqrt{k_{up}}}{\sqrt{k_{up}} + 1} i_{up}(t - \Delta t) \\ i_{down}(t) = G_{eq}u_{down}(t) + \dfrac{k_{up} + \sqrt{k_{up}}}{k_{down}} G_{eq}u_{down}(t - \Delta t) + i_{down}(t - \Delta t) \end{cases},$$

where $i_{up}(t)$ is a current of upper bridge arm of the converter at time t, $i_{down}(t)$ is a current of lower bridge arm of the converter at time t, $i_{up}(t–Δt)$ is a current of upper bridge arm of the converter at previous time (t–Δt), $i_{down}(t–Δt)$ is a current of lower bridge arm of the converter at previous time (t–Δt), $u_{up}(t)$ is a voltage of upper bridge arm of the converter at time t, $u_{down}(t)$ is a voltage of lower bridge arm of the converter at time t, $u_{up}(t–Δt)$ is a voltage of upper bridge arm of the converter at previous time (t–Δt), $u_{down}(t–Δt)$ is a voltage of lower bridge arm of the converter at previous time (t–Δt), and $G_{eq}$ is an electromagnetic transient simulation equivalent admittance;

Step (45), models for the control link, grid-side interface, etc. of the electromagnetic transient simulation system of the converter are established, combining the basic equation I=YU of the electromagnetic transient simulation system of the whole grid;

Step (46), the electromagnetic transient simulation equation of the converter is solved in combination with interface parameters, to obtain the current state quantity of each node for updating the electromagnetic transient equivalent admittance matrix and historical current source, and step (43) is returned to continue the calculation until the simulation termination time arrives.

The following compares electromagnetic transient model simulation waveforms of three different power electronic converters to illustrate the technical advantages of the parametric constant admittance modeling method for the converter based on cross initialization.

Figure 4:
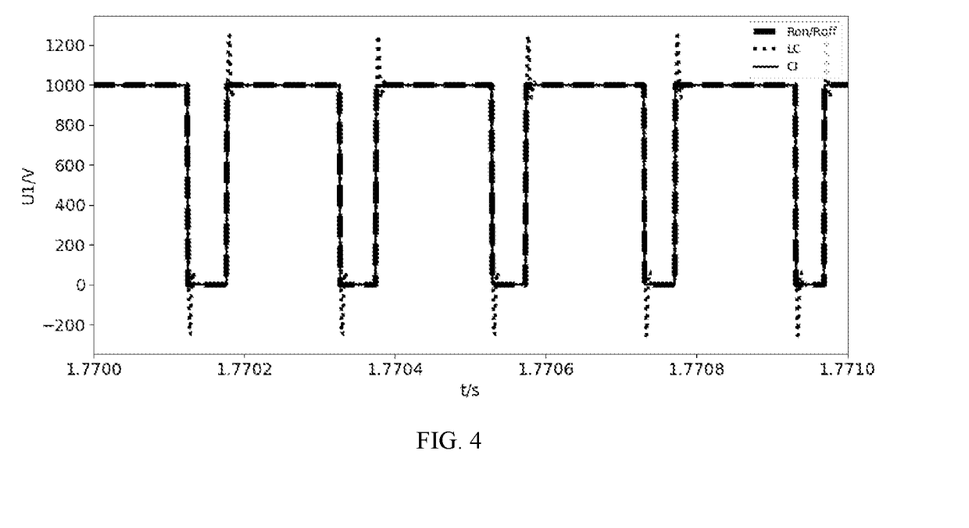
FIG. 4 is a comparison diagram of simulated A-phase upper arm switching voltage waveforms of a Ron/Roff model, a LC model and the model of the present invention.
Figure 5:
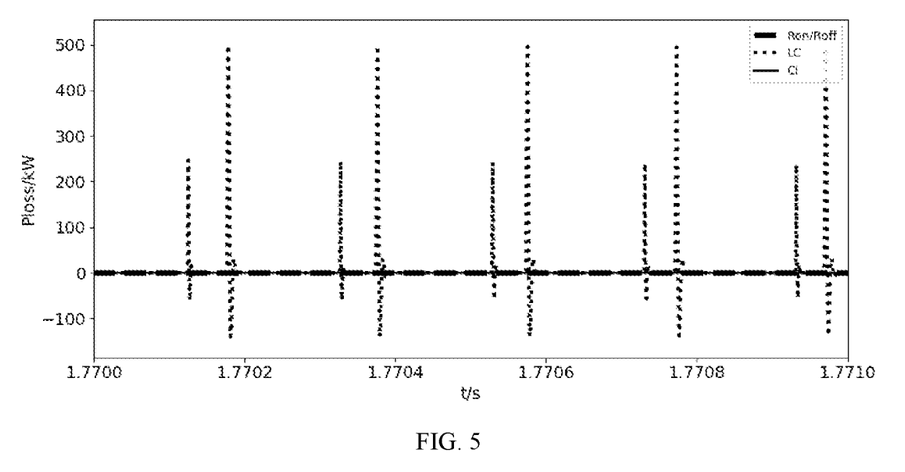
FIG. 5 is a comparison diagram of simulated A-phase upper arm switching power loss waveforms of a Ron/Roff model, a LC model and the model of the present invention.
Figure 6:
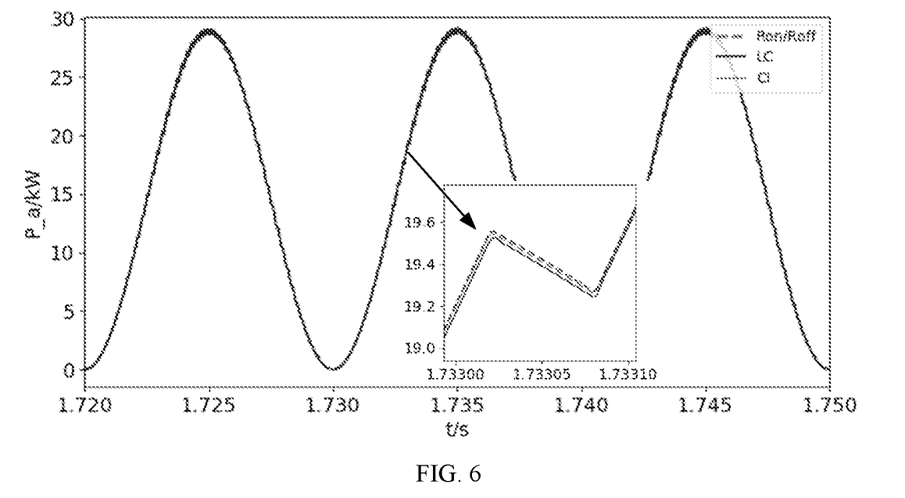
FIG. 6 is a comparison diagram of simulated A-phase output active power of a Ron/Roff model, a LC model and the model of the present invention.

Simulation modeling is performed on a three-phase bridge rectifier system, with a simulation step size of 1 μs. Relevant parameters of the converter model are shown in Table 1. The equivalent electromagnetic transient simulation model of the converter is shown in FIG. 2. The principle of cross initialization is shown in FIG. 3. The simulation waveform comparison of a Ron/Roff model, a LC model and this corrected model is shown in FIGS. 4-6. FIG. 4 shows voltage comparison of A-phase upper arm switches $S_1$, FIG. 5 shows power loss comparison of A-phase upper arm switches $S_1$, and FIG. 6 shows power comparison of A-phase output active power.

TABLE 1

Relevant parameters of converter model

| Relevant parameters of converter model | Parameter size |
|---|---|
| AC voltage source line voltage effective value $U_m$(V) | 380 |
| AC voltage source frequency $f_{ac}$(Hz) | 50 |
| DC side load R(Ω) | 1 |
| DC side capacitance C(mF) | 5 |
| Internal equivalent stray resistance $R_s$(Ω) of the converter | 0.1 |
| Internal equivalent stray inductance $L_s$(mH) of the converter | 8 |
| Inverter switch equivalent admittance $G_{eq}$(S) | 1 |
| Rated active power P(kW) | 45 |
| Rated reactive power Q(kvar) | 0 |
| Carrier frequency $f_T$(Hz) | 5000 |

It can be seen from FIG. 4-6 that the waveform of the corrected converter parameterization model (thin solid line) is closer to that of the Ron/Roff model (thick dashed line) than the waveform of the LC model (thick dotted line). The converter parameterization model based on cross initialization can improve the simulation convergence performance of a converter model and greatly reduce the virtual power loss at the time of state switching. Meanwhile, it can be seen from FIGS. 4-6 that the converter parameterization model based on cross initialization and the Ron/Roff model have substantially identical simulation results, which shows the effectiveness of the method proposed in this invention. It can be seen from FIGS. 4-6 that, in the above-mentioned converter system, without affecting the simulation speed, the converter parameterization model based on cross initialization proposed in this invention has high precision, minimal virtual power loss, and desired steady-state and transient operating characteristics.

What is claimed is:

1. A precise converter parameterized constant admittance modeling method based on a cross initialization, comprising the following steps:

(1) performing an electromagnetic transient simulation modeling on a power electronic converter, wherein switches are modeled using a parametric historical current source constant admittance model and other components are modeled using a traditional electromagnetic transient simulation integral model in the power electronic converter, and giving an initial value and a step size of a system;

(2) detecting whether an operating state switching occurs in the electromagnetic transient simulation and reducing the transient errors by performing a cross initialization correction if the operating state switching occurs, or skipping processing if the operating state switching does not occur;

(3) calculating model parameters according to a network topology and an expected control effect based on the cross initialization correction, and establishing an equivalent electromagnetic admittance matrix and a historical current source of a whole grid, to obtain an electromagnetic transient simulation equivalent model of the power electronic converter;

(4) solving, according to an electromagnetic transient basic solving equation I=YU, an equation established by the electromagnetic transient simulation equivalent model, to obtain an improved electromagnetic transient model simulation result of the power electronic converter at a current time; wherein I is current, Y is admittance, and U is voltage; and (5) updating an electromagnetic transient simulation equivalent admittance matrix and the historical current source based on a current state quantity of each node in a network for solving at next time, and returning to step (2) until a simulation termination time arrives.

2. The converter parameterized constant admittance modeling method based on cross initialization according to claim 1, wherein in step (1), the electromagnetic transient simulation modeling of the power electronic converter comprises power electronic switches, inductors, capacitors and a control portion, and a specific relationship of the electromagnetic transient simulation modeling is as follows:

a direct current (DC) side voltage $U_{dc}$ is provided by an external DC voltage source, and a DC side output current $Id_{dc}$ and an output power $P_{dc}$ passthrough DC side parallel capacitors and then are introduced into several groups of bridge arms composed of upper and lower switches and transmitted to an alternating current (AC) power grid $U_{ac}$; the AC power grid feeds an active power $P_{grid}$ and a reactive power $Q_{grid}$ back to an outer loop controller, the outer loop controller outputs current reference values idref and iqref to an inner loop controller, and the inner loop controller compares AC side dq axis current components id and iq with the current reference values to generate a Sinusoidal Pulse Width Modulation (SPWM) control signal of the power electronic converter.

3. The converter parameterized constant admittance modeling method based on cross initialization according to claim 1, wherein in step (2), the cross initialization correction is specifically as follows:

at a time when an operating state of the power electronic converter is switched, an injection current source for a motion switch is calculated using historical state quantities of a voltage and a current of another switch on a corresponding bridge arm to reduce an error offset of the initial value at a switching time; the operating state of the power electronic converter is assumed to switch from $S_1$ off and $S_2$ on to $S_1$ on and $S_2$ off, and initial values of the cross initialization are obtained:

$$\begin{cases} u'_{up}(t - \Delta t) = u_{down}(t - \Delta t) \\ u'_{down}(t - \Delta t) = u_{up}(t - \Delta t) \\ i'_{up}(t - \Delta t) = -i_{down}(t - \Delta t) \\ i'_{down}(t - \Delta t) = -i_{up}(t - \Delta t) \end{cases};$$

injection current sources $I_{inj,up}(t)$, $I_{inj,down}(t)$ at a time of the operating state switching are solved using initial values of the historical state quantities, wherein $u_{up}'(t-\Delta t)$ is a new initial value of a voltage of an upper bridge arm of the converter at the previous time (t–Δt); $u_{down}(t-\Delta t)$ is a voltage of a lower bridge arm of the converter at the previous time (t–Δt); $u_{down}'(t-\Delta t)$ is a new initial value of a voltage of the lower bridge arm of the converter at the previous time (t–Δt), AO is a voltage of the upper bridge arm of the converter at the previous time (t–Δt); $i_{up}'(t-\Delta t)$ is a new initial value of a current of the upper bridge arm of the converter at the previous time (t–Δt); $i_{down}(t-\Delta t)$ is a current of the lower bridge arm of the converter at the previous time (t–Δt); $i_{down}'(t-\Delta t)$ is a new initial value of a current of the lower bridge arm of the converter at the previous time (t–Δt); and $i_{up}(t-\Delta t)$ is a current of the upper bridge arm of the converter at the previous time (t–Δt).

4. The converter parameterized constant admittance modeling method based on cross initialization according to claim 1, wherein in step (3), establishing the electromagnetic transient simulation equivalent model of the power electronic converter is specifically:

a given power electronic switch is expressed by the following equation:

$$\begin{cases} i(t) = G_{eq}u(t) + I_{inj}(t) \\ I_{inj}(t) = \alpha G_{eq}u(t - \Delta t) + \beta i(t - \Delta t) \end{cases};$$

wherein α and β are respectively a voltage coefficient and a current coefficient of an equivalent injection current source, i(t) is a current at time t, $G_{eq}$ is an electromagnetic transient simulation equivalent admittance, u(t) is a voltage at time t, $I_{inj}(t)$ is an equivalent injection current source at time t, u(t–Δt) is a voltage at previous time (t–Δt), and i(t–Δt) is a current at previous time (t–Δt);

for components such as inductors as reflected as subscript L and capacitors as reflected as subscript C, an equivalent admittance and the historical current source are solved using a backward Euler method:

$$\begin{cases} i_L(t) = \dfrac{\Delta t}{L}u_L(t) + i_L(t - \Delta t) = G_{eq}u_L(t) + I_{inj,L}(t) \\ i_C(t) = \dfrac{C}{\Delta t}u_C(t) - \dfrac{C}{\Delta t}u_C(t - \Delta t) = G_{eq}u_C(t) + I_{inj,C}(t) \end{cases};$$

wherein the above equations are algebraic equations comprising unknown state quantities voltage u(t) and current i(t) and known state quantities voltage u(t–Δt) at a previous time and current i(t–Δt) at the previous time, wherein C is an equivalent capacitance when a switch is off and L is an equivalent inductance when a switch is on, wherein the above equations are simplified to obtain $i = G_{eq}*u + I_{inj}$, then the electromagnetic transient simulation equivalent admittance $G_{eq}$ and the equivalent injection current source $I_{inj}$ is obtained, and an algebraic equation set is solved according to I=YU.

5. The converter parameterized constant admittance modeling method based on cross initialization according to claim 1, wherein the step of establishing the electromagnetic transient simulation modeling according to the network topology and the expected control effect is as follows:

(41) establishing a parametric constant admittance model of the power electronic converter:

$$\begin{cases} i_{up}(t) = G_{eq1}u_{up}(t) + I_{inj,up}(t) = G_{eq1}u_{up}(t) + \\ \quad \alpha_{up}G_{eq1}u_{up}(t - \Delta t) + \beta_{up}i_{up}(t - \Delta t) \\ i_{down}(t) = G_{eq2}u_{down}(t) + I_{inj,down}(t) = G_{eq2}u_{down}(t) + \\ \quad \alpha_{down}G_{eq2}u_{down}(t - \Delta t) + \beta_{down}i_{down}(t - \Delta t) \\ i_L(t) = G_L u_L(t) + I_{inj,L}(t) = G_L u_L(t) + i_L(t - \Delta t) \end{cases};$$

wherein $i_{up}(t)$ is a current of an upper bridge arm of the converter at time t, $i_{down}(t)$ is a current of a lower bridge arm of the converter at time t, $u_{up}(t)$ is a voltage of the upper bridge arm of converter at time t, $u_{down}(t)$ is a voltage of the lower bridge arm of the converter at time t, $i_{up}(t-\to t)$ is a current of the upper bridge arm of the converter at previous time t–Δt, $i_{down}(t-\Delta t)$ is a current of the lower bridge arm of the converter at previous time t–Δt, $u_{up}(t-\Delta t)$ is a voltage of the upper bridge arm of the converter at previous time t–Δt, $u_{down}(t-\Delta t)$ is a voltage of the lower bridge arm of the converter at previous time t–Δt, $I_{inj,up}(t)$ is an equivalent injection current source of the upper bridge arm of the converter at time t, $I_{inj,down}(t)$ is an equivalent injection current source of the lower bridge arm of the converter at time t, $\alpha_{up}$ and $\beta_{up}$ are respectively a voltage coefficient and a current coefficient of an equivalent injection current source of the upper bridge arm of the converter, $\alpha_{down}$ and $\beta_{down}$ are respectively a voltage coefficient and a current coefficient of an equivalent injection current source of the lower bridge arm of the converter, $G_{eq1}$ is the electromagnetic transient simulation equivalent admittance of the upper bridge arm of the converter, $G_{eq2}$ is the electromagnetic transient simulation equivalent admittance of the lower bridge arm of the converter, $i_L(t)$ is a current of an inductance in the converter at time t, $i_L(t-\Delta t)$ is a current of an inductance in the converter at previous time (t–Δt), $u_L(t)$ is a voltage of an inductance in the converter at time t, $G_L$ is an electromagnetic transient simulation equivalent admittance of the inductance, and $I_{inj,L}(t)$ is an equivalent injection current source of an inductance at time t.

(42) performing a complex frequency domain steady-state operation analysis on a switch model to obtain a switch model parameter expression as:

$$\begin{cases} i_{on}(t) = G_{eq}u_{on}(t) + \alpha_{on}G_{eq}u_{on}(t-\Delta t) + i_{on}(t-\Delta t), & S=1 \\ i_{off}(t) = G_{eq}u_{off}(t) - G_{eq}u_{off}(t-\Delta t) + \beta_{off}i_{off}(t-\Delta t), & S=0 \end{cases};$$

wherein $i_{on}(t)$ is a current at time t when switch is on, $i_{off}(t)$ is a current at time t when switch is off, $i_{on}(t-\Delta t)$ is a current at previous time (t–Δt) when switch is on, $i_{off}(t-\Delta t)$ is a current at previous time (t–Δt) when switch is off, $u_{on}(t)$ is a voltage at time t when switch is on, $u_{off}(t)$ is a voltage at time t when switch is off, $u_{on}(t-\Delta t)$ is a voltage at previous time (t–Δt) when switch is on, $u_{off}(t-\Delta t)$ is a voltage at previous time (t–Δt) when switch is off, $\alpha_{on}$ is a voltage coefficient of an equivalent injection current source when switch is on, $\beta_{off}$ is the current coefficient of the equivalent injection current source when switch is off, and $G_{,eq}$ is an electromagnetic transient simulation equivalent admittance;

(43) solving a matrix equation about a midpoint voltage of converter bridge arms and the switches in an off state according to the network topology, taking a turn-on upper bridge arm switch and a turn-off lower bridge arm switch as an example:

$$\begin{bmatrix} u_{mid,n} \\ \frac{i_{down,n}}{G_{eq2}} \end{bmatrix} = \begin{bmatrix} k_{down} - \alpha_{up}k_{up} & (1-\beta_{down})k_{down} \\ k_{down} - 1 - \alpha_{up}k_{up} & (k_{down} - \beta_{down}k_{down} + \beta_{down}) \end{bmatrix}$$

-continued $$\begin{bmatrix} u_{mid,n-1} \\ \frac{i_{down,n-1}}{G_{eq2}} \end{bmatrix} + \begin{bmatrix} (1-k_{up}-k_{down})u_{pv} \\ (1-k_{up}-k_{down})u_{pv} \end{bmatrix} = A \begin{bmatrix} u_{mid,n-1} \\ \frac{i_{down,n-1}}{G_{eq2}} \end{bmatrix} + B,$$

where $$k_{up} = \frac{G_{eq1}}{G_{eq1}+G_{eq2}+G_L}$$

$$k_{down} = \frac{G_{eq2}}{G_{eq1}+G_{eq2}+G_L};$$

wherein $u_{mid,n}$ is a midpoint voltage of bridge arm of converter at time t, $u_{mid,n-1}$ is a midpoint voltage of bridge arm of the converter at previous time (t–Δt), $i_{down,n}$ is a current of lower bridge arm of the converter at time $t_{i_{down,n-1}}$ is the current of lower bridge arm of converter at previous time (t–Δt), $u_{pv}$, is the constant voltage on the dc side, $k_{up}$ and $k_{down}$ are respectively a coefficient of upper bridge arm and lower bridge arm of the converter, $G_{eq1}$ is the electromagnetic transient simulation equivalent admittance of upper bridge arm of converter, $G_{eq2}$ is the electromagnetic transient simulation equivalent admittance of lower bridge arm of converter, $G_L$ is an electromagnetic transient simulation equivalent admittance of the inductance;

(44) analyzing transient operating characteristics of a parameterized model to obtain corresponding parameters of the parameterized model in two different operating states as follows: when $$\begin{cases} S_{up} = 1 \\ S_{down} = 0 \end{cases};$$

$$\begin{cases} i_{up}(t) = G_{eq}u_{up}(t) + \frac{k_{down}+\sqrt{k_{down}}}{k_{up}}G_{eq}u_{up}(t-\Delta t) + i_{up}(t-\Delta t) \\ i_{down}(t) = G_{eq}u_{down}(t) - G_{eq}u_{down}(t-\Delta t) + \frac{\sqrt{k_{down}}}{\sqrt{k_{down}}+1}i_{down}(t-\Delta t) \end{cases};$$

when $$\begin{cases} S_{up} = 0 \\ S_{down} = 1 \end{cases};$$

$$\begin{cases} i_{up}(t) = G_{eq}u_{up}(t) - G_{eq}u_{up}(t-\Delta t) + \frac{\sqrt{k_{up}}}{\sqrt{k_{up}}+1}i_{up}(t-\Delta t) \\ i_{down}(t) = G_{eq}u_{down}(t) + \frac{k_{up}+\sqrt{k_{up}}}{k_{down}}G_{eq}u_{down}(t-\Delta t) + i_{down}(t-\Delta t) \end{cases};$$

wherein $i_{up}(t)$ is a current of upper bridge arm of the converter at time t, $i_{down}(t)$ is a current of lower bridge arm of the converter at time t, $i_{up}(t-\Delta t)$ is a current of upper bridge arm of the converter at previous time (t–Δt), $i_{down}(t-\Delta t)$ is a current of lower bridge arm of the converter at previous time (t–Δt), $u_{up}(t)$ is a voltage of upper bridge arm of the converter at time t, $u_{down}(t)$ is a voltage of lower bridge arm of the converter at time t, $u_{up}(t-\Delta t)$ is a voltage of upper bridge arm of the converter at previous time (t–Δt), $u_{down}(t-\Delta t)$ is a voltage of lower bridge arm of the converter at previous time (t−Δt), and $G_{eq}$ is an electromagnetic transient simulation equivalent admittance;

(45) establishing models for a control link, a grid-side interface, of an electromagnetic transient simulation system of the power electronic converter, combining the electromagnetic transient basic solving equation I=YU of the electromagnetic transient simulation system of the whole grid; and (46) solving an electromagnetic transient simulation equation of the power electronic converter in combination with interface parameters, to obtain the current state quantity of the each node for updating the electromagnetic transient simulation equivalent admittance matrix and the historical current source, and returning to step (43) to continue a calculation until the simulation termination time arrives.

* * * * *